United States Patent [19]

Matsumoto et al.

[11] 4,266,335

[45] May 12, 1981

[54] METHOD OF PRODUCING ELECTROCHROMIC DISPLAY DEVICE

[75] Inventors: Shoichi Matsumoto; Hirohisa Kato, both of Yokohama; Yusuke Wada, Kawasaki, all of Japan

[73] Assignee: Tokyo Shibaura Denki Kabushiki Kaisha, Kawasaki, Japan

[21] Appl. No.: 16,786

[22] Filed: Mar. 2, 1979

[30] Foreign Application Priority Data

Mar. 10, 1978 [JP] Japan .................. 53-26663

[51] Int. Cl.$^3$ ................................ G02F 1/13
[52] U.S. Cl. .................. 29/592 R; 350/357
[58] Field of Search .......... 29/592 R, 624, 825; 350/357; 427/64, 126, 226, 350, 377

[56] References Cited

U.S. PATENT DOCUMENTS

| | | | |
|---|---|---|---|
| Re. 30,147 | 11/1979 | Jordan et al. | 427/110 X |
| 3,521,941 | 2/1967 | Deb et al. | 350/160 X |
| 3,938,242 | 2/1976 | Sussman | 29/592 X |
| 3,967,882 | 7/1976 | Kubota et al. | 29/592 X |
| 4,123,841 | 11/1978 | Yano et al. | 350/357 X |
| 4,124,411 | 11/1978 | Meuleman et al. | 427/241 X |
| 4,126,489 | 11/1978 | Williams | 427/126 X |

OTHER PUBLICATIONS

Zeller, et al. "Electrochromism and Local Order in Amorphous WO$_3$", Appl. Phys., 13, 231–237 (1977).
Deb, "Optical and Photoelectric Properties and Colour Centres in Thin Films of Tungsten Oxide", Phil. Mag. 27, pp. 801–822.
Hurditch, "Electrochromism in Hydrated Tungsten-Oxide Films", Electronics Lett. 11, pp. 142–144 (1975).

*Primary Examiner*—Carl E. Hall
*Assistant Examiner*—John A. Bacsalmassy
*Attorney, Agent, or Firm*—Oblon, Fisher, Spivak, McClelland & Maier

[57] ABSTRACT

An electrochromic display device comprising two electrode substrates, at least one of which is transparent is prepared by applying a solution containing one or more transition metal compounds under an inert atmosphere to the surface of at least one of said electrode substrates. Then, the solution is dried so as to form an electrochromic layer on the surface of the electrode substrate. The drying is carried out by using a temperature ranging between room temperature and 120° C. Finally, the two electrode substrates are fixed in a manner to face each other with an ionic conductor layer or electrolyte layer disposed therebetween to obtain the electrochromic display device.

9 Claims, 2 Drawing Figures

METHOD OF PRODUCING ELECTROCHROMIC DISPLAY DEVICE

BACKGROUND OF THE INVENTION

This invention relates to a method of producing an electrochromic display device and more particularly to the improvement in the method of forming the electrochromic layer of such a display device.

Transition metal compounds such as tungsten oxide are known as materials exhibiting electrochromism and electrochromic display devices utilizing the electrochromism have been developed. In general, such a display device is constructed such that an electrochromic layer and an ionic conductor or electrolyte layer are sandwiched between a pair of mutually facing electrode substrates at least one of which is transparent.

For forming an electrochromic layer, it is customary to deposit a transition metal compound on an electrode substrate by means of vacuum deposition, sputtering, etc. Alternatively, powder of a transition metal compound is suitably shaped and sintered, or paste is prepared from such a powder. The sintered mass or paste of the powder is disposed between a pair of electrodes to provide an electrochromic layer.

However, the former method utilizing deposition necessitates troblesome operations and a costly apparatus for forming an electrochromic layer about 0.1 to 10 μm thick uniformly over a large area and, thus, is not economical. On the other hand, it is difficult to form a uniform electrochromic layer over a large area by employing the latter method. Thus, an electrochromic display device comprising a electrochromic layer formed by the latter method tends to be unsatisfactory in the contrast of the displayed pattern.

SUMMARY OF THE INVENTION

An object of this invention is to provide a method which permits readily producing an electrochromic display device and is free from the above-noted difficulties inherent in the conventional method.

According to this invention, there is provided a method of producing an electrochromic display device comprising:

applying under an inert atmosphere a solution containing one or more transition metal compounds to the surface of at least one of two electrode substrates, at least one of said substrates being transparent, thereby forming a thin layer of said solution;

drying the thin layer of solution by using a temperature between room temperature and 120° C. to form an electrochromic layer on the surface of the electrode substrate; and fixing the two electrode substrates in a manner to face each other with an ionic conductor layer disposed therebetween.

BRIEF DESCRIPTION OF THE DRAWING

This invention will be more fully understood from the following detailed deseription when taken in conjunction with the appended drawings, in which.

DETAILED DESCRIPTION OF THE PREFERRED EMBODIMENTS

Figure 1:
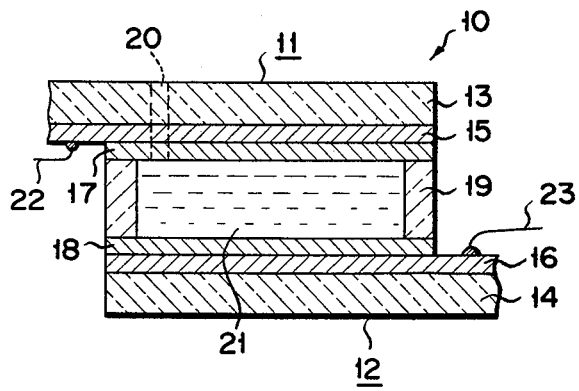
FIG. 1 is a cross sectional view of an electrochromic display device produced according to one embodiment of this invention.

FIG. 1 shows an electrochromic display device 10 produced by the method of this invention. As shown in the figure, the display device 10 comprises a pair of electrode substrates 11 and 12 disposed to face each other. The electrode substrate 11 consists of a glass substrate 13 and an electrode layer 15 formed on the glass substrate 13. Likewise, the electrode substrate 12 consists of a glass substrate 14 and an electrode layer 16 formed on the glass substrate 14. Each of these electrode layers 15 and 16 is formed of, for example, tin oxide. Although the electrode substrates 11 and 12 are both transparent in the embodiment of FIG. 1, it suffices to make transparent at least one of these electrode substrates in this invention.

Electrochromic layers 17 and 18 are formed on the electrode layers 15 and 16, respectively. In this invention, the electrochromic layer is formed by coating the surface of the electrode layer under an inert atmosphere with a solution of a transition metal compound by spinner method, immersion method, etc. so as to form a uniform thin layer of the solution, followed by drying the solution layer by using a temperature ranging between room temperature and 120° C.

Inorganic and organic compounds of transition metals can be used in this invention including, for example, oxides such as tungsten oxide and molybdenum oxide; alkoxides such as tungsten ethoxide and molybdenum ethoxide; halides such as tungsten chloride, molybdenum chloride and niobium chloride; and oxyacids of tungsten and molybdenum. These transition metal compounds may be used singly or in combination. In terms of contrast of the displayed color, it is preferred to use a mixture of, particularly, tungsten chloride and niobium chloride. Also, among the transition metal compounds exemplified above, the halides and alkoxides are preferred in terms of adhesivity to the electrode layer and contrast of the displayed color.

Suitable solvents used in this invention for dissolving the transition metal compound are non-aqueous liquid and include, for example, alcohols such as ethanol and butanol; ketones such as acetone and methyl ethyl ketone; esters such as methyl formate and ethyl acetate; and other organic solvents such as cellosolves, propylene carbonate and acetonitrile. Among these solvents methanol, ethanol and butanol are preferred because they readily dissolve transition metal compounds and provide a uniform film. Particularly preferred is n-butanol, which dissolves the transition metal compound very effectively and provides a very uniform solution of said compound. The concentration of the transition metal compound in the solution is suitably adjusted depending on the thickness of the solution layer to be formed, etc., and is chosen in general to fall within the range of about 5 to 50% by weight, though the concentration need not be restricted to the range mentioned above in this invention.

In this invention, the solution of a transition metal compound is applied to the electrode layer under an inert atmosphere. Otherwise, the produced electrochromic display device tends to be unsatisfactory in terms of contrast of the displayed color. Suitable inert atmospheres used in this invention include, for example, nitrogen gas and argon gas.

It is possible to allow the solution of a transition metal compound and, thus, the resultant electrochromic layer, to contain suitable amounts of various other substances such as gold, silver, platinum, aluminum, zinc oxide, silicon oxide and the like.

It is preferred in terms of contrast of the displayed color that the electrochromic layer have a thickness ranging between 500 Å and 10,000 Å, desirably between 500 Å and 5,000 Å. Thus, the thickness of the thin layer formed of the transition metal compound solution is determined so as to provide an electrochromic layer of the above-mentioned thickness after the drying step described below.

The solution layer is dried by using a temperature ranging between room temperature (about 20° C.) and 120° C., preferably, between 20° C. and 50° C. If the drying is carried out by using a temperature higher than 120° C., the produced electrochromic display device tends to be unsatisfactory in terms of contrast of the displayed color. The drying can be performed under various atmospheres with or without the heating. Specifically, the solution layer can be dried under an inert atmosphere such as nitrogen gas or argon gas at the above noted temperature. It is also possible to perform the drying under vacuum of, preferably, $10^{-1}$ to $10^{-2}$ torr at the above-noted temperature. Further, the solution layer can be dried by disposing it in an atmosphere of ionized gas or radical gas (i.e., plasma atmosphere), e.g., in an argon gas in the form of ion or radical. In this case, the temperature is elevated up to 120° C. without employing the heating. It is certainly possible to perform the drying under air atmosphere, but it is preferred to employ heating under vacuum or to dispose the solution layer in a plasma atmosphere. In general, the drying operation is continued for about 10 minutes to about 10 hours so as to form the electrochromic layers 17 and 18 each formed of transition metal compounds consisting mainly of oxides.

The electrode substrates 11 and 12 having the electrochromic layers 17 and 18 formed thereon, respectively, are fixed to face each other with a glass spacer 19 disposed therebetween. Then, an ionic conductive material (or electrolyte) is poured into the space defined by the electrode substrates 11, 12 and the spacer 19 through a hole 20 bored through the electrode substrate 11 so as to form an ionic conductor layer 21 and, thus, provide the aimed product of electrochromic display device. Incidentally, reference numerals 22 and 23 shown in FIG. 1 represent lead wires.

In the practice of this invention, the ionic conductor layer is provided by a material exhibiting fluidity such as a mixture of sulfuric acid, glycerin and titanium oxide, or a mixture of propylene carbonate solution of lithium perchlorate and titanium oxide.

As described above in detail, an electrochromic layer is formed in the method of this invention by coating and subsequently drying a solution containing a transition metal compound. This renders it possible to form a uniform electrochromic layer of a desired thickness on the surface of an electrode substrate having an optional area. It follows that the method of this invention permits readily producing an electrochromic display device capable of displaying a uniform pattern of good contrast, without involving troublesome operations and without necessitating a costly apparatus of complex structure.

Described below are Examples of this invention. In the following Examples, all "parts" and "%" are by weight unless otherwise specified.

EXAMPLE 1

(A) Tungsten chloride, 300 parts, was added to 1,200 parts of n-butanol and sufficiently stirred to prepare a uniform solution. Then, a thin layer of the solution was formed under nitrogen atmosphere on the electrode layer of each of two transparent electrode substrates by immersion, followed by air-drying to form electrochromic layers each having a thickness of 0.1 μm on the electrode layers. An electrochromic display device as shown in FIG. 1 was prepared by using these two electrode substrates. Incidentally, a mixture consisting of 1 part of sulfuric acid, 4 parts of glycerin and 1 part of titanium oxide was used as the ionic conductor layer in the electrochromic display device.

(B) An additional electrochromic display device was produced by just the same procedures as in case (A) except that the drying for forming the electrochromic layer was performed at 80° C.

A voltage of rectangular wave form in which a cycle of $+3.0$ V and $-3.0$ V recurs every second was applied to each of these electrochromic display devices, with the result that each of the devices repeatedly displayed a dense blue color satisfactorily even after $10^5$ cycles of $+3.0$ V and $-3.0$ V application.

EXAMPLE 2

An electrochromic display device was produced by the procedures as in Example 1, case (A), except that a solution prepared by dissolving 15 parts of tungsten oxide in 100 parts of methyl isobutyl ketone was used in place of the butanol solution of tungsten chloride. The produced display device was subjected to a color display test as in Example 1, with the result that the display device was fully comparable with the devices obtained in Example 1 in various properties, though the device of Example 2 was somewhat inferior to those of Example 1 in percentage of contrast and adhesivity of the electrochromic layer to the substrate.

EXAMPLE 3

A uniform solution was prepared by dissolving 2 parts of molybdenum oxide in 20 parts of n-butanol. Then, a thin layer of the solution was formed under nitrogen atomsphere on the electrode layer of each of two transparent electrode substrates by immersion, followed by air-drying and, subsequently, drying under heating at 60° C. to form molybdenum oxide layers (electrochromic layers) each having a thickness of 0.07 μm on the electrode layers.

An electrochromic display device as shown in FIG. 1 was produced by using these two electrode substrates, with a mixture consisting of 1 part of titanium oxide and 4 parts of propylene carbonate solution containing 1 mol of lithium perchlorate used as the ionic conductor layer. The display device thus produced was subjected to a color display test as in Example 1, with the result that a blackish blue color was repeatedly displayed satisfactorily. Specifically, no deterioration was recognized in the displayed color even after the color display was repeated $10^5$ times.

EXAMPLE 4

An electrochromic display device was produced in accordance with the procedures as in Example 1, case (A), except that the tungsten chloride solution used in Example 1 was replaced by a solution prepared by mixing 20% n-butanol solution of niobium chloride with 20% n-butanol solution of tungsten chloride such that the niobium chloride content of the mixed solution was 10 mol % based on the total amount of niobium chloride and tungsten chloride contained in the mixed solution.

The produced display device was subjected to a color display test as in Example 1, with the result that a blue color was repeatedly displayed satisfactorily. Specifically, the displayed color was scarcely deteriorated even after the color display was repeated $10^5$ times. Further, the display device of Example 4 was 1.2 times as high in percentage of contrast as those of Example 1, and the color was clear.

EXAMPLES 5 TO 8

A thin layer of 20% n-butanol solution of tungsten chloride was formed under nitrogen atmosphere on the electrode layer of each of eight transparent electrode substrates, followed by treating four pairs of these substrates under the conditions shown in Table A below so as to form electrochromic layers, respectively.

TABLE A

| | Treating Conditions | | |
|---|---|---|---|
| Examples | Atmosphere | Temperature | Time |
| 5 | Nitrogen gas | Room temperature | 1 hr. |
| 6 | Vacuum ($10^{-1}$ to $10^{-2}$ torr) | Room temperature | 1 hr. |
| 7 | Vacuum ($10^{-1}$ to $10^{-2}$ torr) | 100° C. | 1 hr. |
| 8 | Argon plasma | — | 600 sec. |

Four electrochromic display devices of the construction as shown in FIG. 1 were produced by using the four pairs of the substrates having electrochromic layers formed thereon in the preceding step, with a mixture consisting of 1 part of sulfuric acid, 4 parts of glycerin and 1 part of titanium oxide used as the ionic conductor layer in each of the four electrochromic display devices.

A voltage of 2.0 V having a rectangular wave form of 0.3 Hz was applied to each of the four display device so as to enable the device to display color repeatedly, thereby measuring the contrast of the displayed color.

Figure 2:
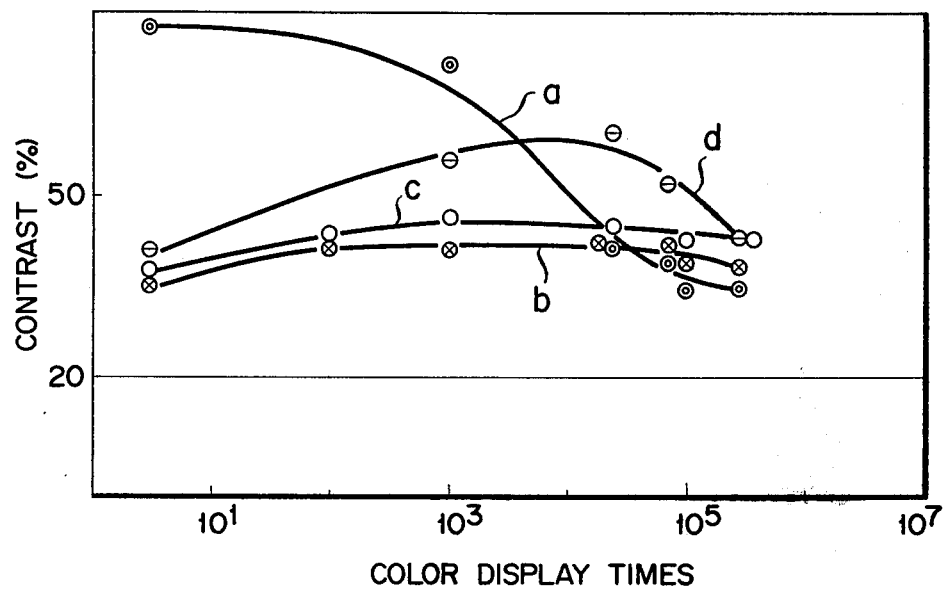
FIG. 2 is a graph showing properties of electrochromic display devices produced according to several different embodiments of this invention.

The results are shown in FIG. 2, in which curves (a) to (d) relate to Examples 5 to 8, respectively.

What we claim is:

1. A method of producing an electrochromic display device comprising:

applying under an inert atmosphere a solution containing at least one transition metal compound selected from the group consisting of halides and alkoxides of transition metals dissolved in an organic solvent to the surface of at least one of two electrode substrates, at least one of said substrates being transparent, thereby forming a thin layer of said solution;

drying the thin layer of solution by using a temperature between room temperature and 120° C. to form an electrochronic layer on the surface of the electrode substrate; and fixing the two electrode substrates in a manner to face each other with an ionic conductor layer disposed therebetween.

2. The method according to claim 1, wherein the drying is performed under an inert atmosphere.

3. The method according to claim 1, wherein the drying is performed under vacuum.

4. The method according to claim 3, wherein the degree of vacuum is $10^{-1}$ to $10^{-2}$ torr.

5. The method according to claim 1, wherein the drying is performed under an atmosphere of reactive gas.

6. The method according to claim 1, wherein the layer of the solution is formed thick enough to provide an electrochromic layer having a thickness of 500 to 10,000 Å after the subsequent step of drying.

7. The method according to claim 1, wherein the transition metal is tungsten.

8. The method according to claim 1, wherein the solution is an alcohol solution.

9. The method according to claim 1, wherein the solution is ketone solution.

* * * * *